Feb. 14, 1961 W. HECOX ET AL 2,972,126
VOLTAGE CLASSIFIER
Filed Oct. 10, 1955

INVENTOR.
William Hecox
Carl C. Gebhardt
BY Edward J. Norig
ATTORNEY.

United States Patent Office 2,972,126
Patented Feb. 14, 1961

2,972,126

VOLTAGE CLASSIFIER

William Hecox, Groveport, and Carl C. Gebhardt, Columbus, Ohio, assignors, by mesne assignments, to The Sheffield Corporation, a corporation of Delaware Filed Oct. 10, 1955, Ser. No. 539,484

14 Claims. (Cl. 340—172)

This invention relates to voltage classifiers. It has to do particularly with circuits for classifying voltages according to their amplitudes and for providing a predetermined response to any voltage applied depending upon its classification.

A primary object of the present invention is to provide a voltage classifier that receives an input voltage, whose amplitude may vary in accordance with a physical characteristic such as size dimension, weight, pressure, or electrical resistance, and provides a predetermined response depending upon the classification of the input voltage according to its amplitude, the range of input voltages being divided into a plurality of classes.

The response may be the actuation of one of a plurality of relays indicating respectively each of the amplitude classifications of input voltages. The relay may provide further actions such as the operation of a solenoid or counter, the lighting of a signal light, or the actuation of another relay. If desired, the number of classes and their widths may be easily changed.

A voltage-classifying circuit according to the present invention comprises means for applying an input voltage at a predetermined part of the circuit, means for applying in opposition to a voltage that is a function of the input voltage a succession of predetermined voltages, increasing in steps, means for detecting whether each voltage in the succession is at least equal to a voltage that is a predetermined function of the input voltage, means for stopping the application of the succession of voltages at a step depending upon the first step at which the voltage applied is at least equal to the function of the input voltage, and means for providing a predetermined response depending upon the step at which the application of the succession of voltages stopped.

In a preferred embodiment of the invention a signal from a gauge or other transducer for measuring a physical characteristic is connected as an input voltage to an amplifier. The output of the amplifier operates a high-speed relay, which controls the power to a stepping switch. One bank of the stepping switch feeds back in opposition to the input voltage, or the sum of the input voltage and a center-zero voltage, a succession of voltages from a voltage source and voltage divider. As the switch moves from step to step, the voltage picked off by the wiper arm of the voltage divider increases. The polarity of the feedback voltage is opposite to that of the net of the input voltage and the center-zero voltage. When the input voltage is applied, the output of the amplifier operates the high-speed relay and actuates the stepping switch. As the stepping switch moves, the output of the amplifier decreases in steps until it becomes zero. When the amplifier output is zero, the high-speed relay is no longer energized and the stepping switch stops. The position at which the stepping switch stops indicates the amplitude classification of the input voltage. Another bank of contacts of the stepping switch is connected to actuate individual output relays, one for each input voltage classification. The ranges of the classes depend upon the positions at which the voltage divider is tapped. Ordinarily, equal ranges are desirable, but for some purposes unequal ranges may be provided by moving the taps on the voltage divider. The number of classes that can be established depends upon the number of independent contact points on the stepping switch.

One known method of classifying employs a number of thyratrons or vacuum tubes, each biased at a different value. A tube operates or fires only when the input voltage exceeds a certain value depending on the bias voltage. This is commonly called a parallel system, since the input voltage is applied to all of the tubes in parallel. For a given input voltage several tubes may fire, so additional relay circuitry is necessary to assure that only one output relay is operated for a given input signal.

In contrast, a voltage classifier according to the present invention uses a series or sequential method to determine the amplitude class in which a given input voltage falls. The classifier scans a portion of the range, beginning at one end and moving by steps until the proper class is reached. Then it stops.

The present invention provides advantages over the parallel system in simplicity and accuracy.

Circuitry for the sequential circuit of the present invention is less complex and requires fewer parts than the circuitry for a parallel system, reducing costs and likelihood of failure. A parallel system requires additional circuitry for confining the response to the operation of only one output relay for a given class, while the sequential circuit inherently allows only one output relay to operate for a given class.

A parallel system requires higher D.-C. amplification of the input signal and a greater output range than does the series system. This is because of the variability in the firing points of vacuum tubes and thyratrons. Where the firing point may vary by one volt, the range of the D.-C. signal must be 100 volts in order to obtain full-scale accuracy of 1 percent or less. High D.-C. amplification involves many problems, such as stability and drift, regulation of the power supply for the D.-C. amplifier, and higher plate voltages in the D.-C. amplifier needed to maintain good linearity over a wide range. The requirements for the parallel system lead to increased size and cost.

It is another object of the present invention to provide a voltage classifier of the sequential type providing the advantages discussed above.

Other objects and advantages of the invention are apparent from the disclosure herein.

Figure 1:
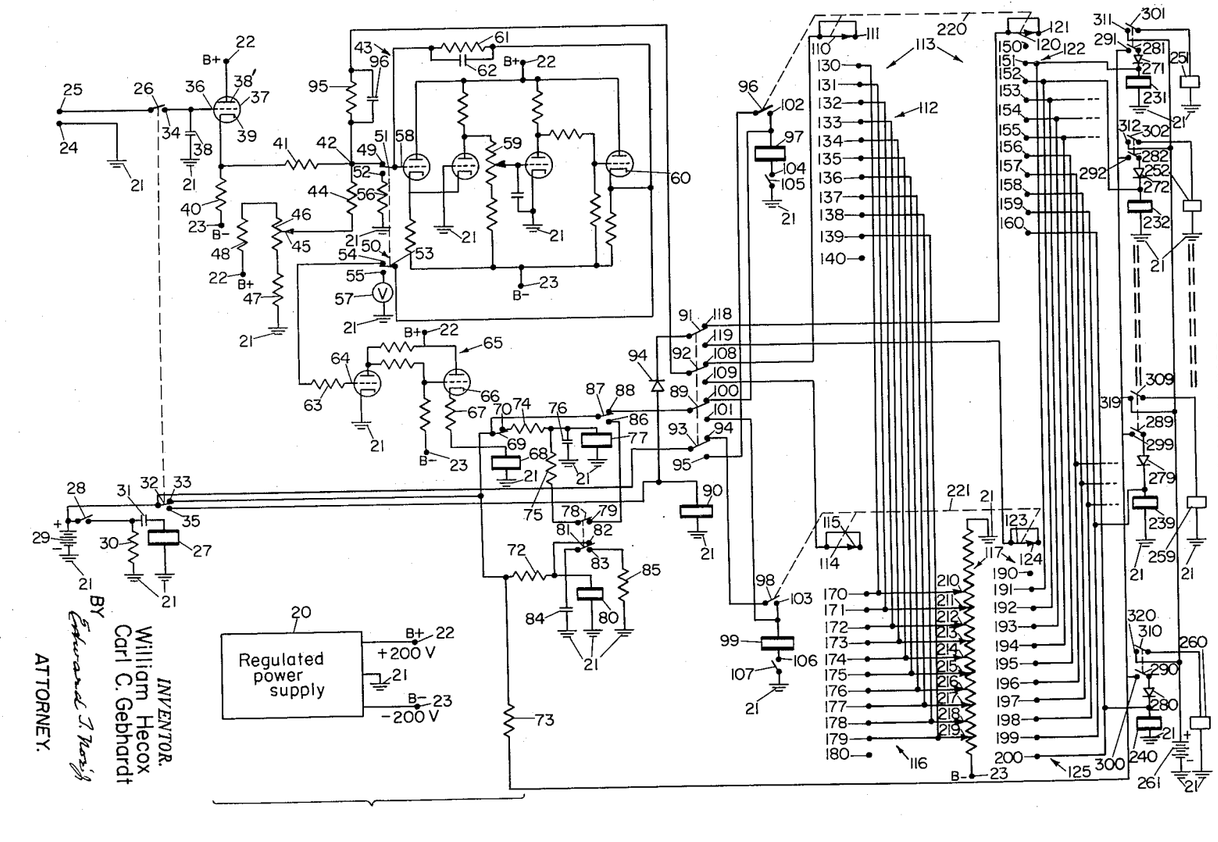
The figure is a schematic diagram of a voltage-classifying circuit according to the present invention.

Referring to the drawing, a regulated power supply 20, which is grounded as is indicated at 21, is used to provide a positive voltage of 200 volts with respect to ground potential at its B+ terminal 22 and a negative voltage of 200 volts with respect to ground potential at its B— terminal 23. Input voltages to be classified are connected across a pair of input terminals 24, 25. The input terminal 24 is grounded at 21, and the input terminal 25 is connected to a contact arm 26 of a pulse relay 27.

One terminal of a microswitch 28, which may be employed in any convenient manner to make contact when an input voltage to be classified is applied to the input terminals 24, 25, is connected to the positive terminal of a direct voltage source 29, the negative terminal of which is grounded at 21. The voltage source 29 may be of any conventional type and is shown for convenience as a battery. The other terminal of the microswitch 28 is connected to one end of a resistor 30 the other end of which is grounded at 21, and to one side of a capacitor 31. The other side of the capacitor 31 is connected to one terminal of the relay 27, the other terminal of which is grounded at 21.

Ganged to the contact arm 26 is another contact arm 32 actuated by the relay 27. The contact arm 26 is normally in its upper, open position, as shown, and the contact arm 32 is normally in its upper position, as shown, in contact with the contact point 33. When a pulse is applied to the relay 27 by the closing of the microswitch 28, the relay 27 is actuated for approximately 30 milliseconds by the current pulse from the voltage source 29 through the microswitch 28 and the capacitor 31. During the time the relay 27 is actuated by the pulse, the contact arm 26 moves down and contacts the contact point 34, and the contact arm 32 moves down and contacts the contact point 35.

The contact point 34 is connected to the grid 36 of a vacuum tube 37, and to one side of a capacitor 38, the other side of which is grounded at 21. The plate 38' of the tube 37 is connected to the B+ terminal 22 of the regulated power supply 20. The cathode 39 of the tube 37 is connected to one end of a resistor 40, the other end of which is connected to the B— terminal 23 of the regulated power supply 20. The cathode 39 is connected also to one end of a resistor 41, the other end of which is connected to the input or summing point 42 of a D.-C. amplifier 43.

The input point 42 is connected to one end of a resistor 44, the other end of which is connected to the adjustable arm 45 of a potentiometer 46. One end of the potentiometer 46 is connected through a resistor 47 to the ground 21, and the other end of the potentiometer 46 is connected through a resistor 48 to the B+ terminal 22 of the regulated power supply 20. The input point 42 is connected also to a contact point 49 of a double-pole double-throw switch 50, which includes a contact arm 51 associated with the contact 49 and another contact point 52, and a contact arm 53 associated with a pair of contact points 54, 55. The contact point 52 is connected to one end of a resistor 56, the other end of which is connected to the ground 21. The contact point 55 is connected to one terminal of a voltmeter 57, the other terminal of which is connected to the ground 21. The switch 50 is normally in its upper position as shown in the drawing, with the contact arm 51 in contact with the contact point 49 and with the contact arm 53 in contact with the contact point 54.

The contact arm 51 is connected to the input grid 58 of the D.-C. amplifier 43. The amplifier 43 is a four-stage D.-C. amplifier of conventional design, and includes a potentiometer 59 for bias adjustment in the third stage. The amplifier 43 is grounded where indicated at 21, the plate side of the circuit is connected as is indicated at 22 to the B+ terminal of the regulated power supply 20, and the cathode side of the amplifier 43 is connected as is indicated at 23 to the B— terminal of the regulated power supply 20. Negative feedback is provided from the output cathode 60 of the amplifier 43 to the input grid 58 through a resistor 61 and a capacitor 62 connected in parallel. The output cathode 60 of the D.-C. amplifier 43 is connected also to the contact arm 53 of the switch 50.

The contact point 54 of the switch 50 is connected through a resistor 63 to the input grid 64 of a two-stage D.-C. amplifier 65, which is grounded as is indicated at 21 and is connected as indicated at 22 and 23, respectively, to the B+ and B— terminals of the regulated power supply 20. The output cathode 66 of the amplifier 65 is connected to one end of a resistor 67 the other end of which is connected to one terminal of a high speed relay 68, the outer terminal of which is grounded at 21. The relay 68 controls a contact arm 69 associated with contact point 70. When the output of the amplifier 65 is zero and the relay 68 is therefore not energized, the contact arm 69 is in its upper position contacting the contact point 70 as is shown in the drawing. When an output is supplied from the amplifier 65 energizing the relay 68 the contact arm moves down to an open position.

The contact arm 69 of the relay 68 is connected to the upper contact point 33 of the relay 27, to the left end of a resistor 72, and to the upper end of a resistor 73. The contact point 70 of the relay 68 is connected to one end of a resistor 74, the other end of which is connected to one end of a resistor 75, one side of a condenser 76, and one terminal of a fast-acting mercury-contact relay 77. The other terminal of the relay 77 and the other side of the condenser 76 are grounded at 21.

The other end of the resistor 75 is connected to a contact arm 78 associated with a contact point 79 of a lock-in relay 80, which also controls a contact arm 81 associated with an upper contact point 82 and a lower contact point 83. The upper contact point 82 is connected to the right end of the resistor 72 and to one terminal of the relay 80. The other terminal of the relay 80 is grounded at 21. The contact arm 81 is connected to one side of a capacitor 84, the other of which is grounded at 21. The lower contact point 83 is connected to one end of a resistor 85, the other end of which is connected to the ground 21. The contact point 79 is connected to a lower contact point 86, associated with a contact arm 87 and an upper contact point 88 of the relay 77. The contact arm 87 of the relay 77 is connected to the contact arm 69 of the relay 68.

The upper contact point 88 of the relay 77 is connected to a contact arm 89 of a transfer switch 90. Ganged to the contact arm 89, and controlled by the transfer switch 90, are three other contact arms 91, 92, 93. The contact arm 91 is connected to the negative terminal of a rectifier 94 the positive terminal of which is connected to one terminal of the relay 90 and to the lower contact point 35 of the pulse relay 27. The other terminal of the relay 90 is grounded at 21. The contact arm 92 is connected through a resistor 95 and a capacitor 96, connected in parallel, to the input point 42 of the D.-C. amplifier 43. The contact arm 93 is connected to the contact arm 32 of the pulse relay 27.

The contact arms 89, 91, 92, 93 of the transfer switch 90 operate together and are always in the same position, either all up or all down. When the contact arms 89, 91, 92, 93 are in the upper position shown in the drawing, energizing the transfer switch 90 causes the mechanism to cock, and when the transfer switch 90 is de-energized the mechanism releases, moving the contact arms 89, 91, 92, 93 to their lower position. With the contact arms 89, 91, 92, 93 in their lower position, energizing the transfer switch 90 causes the mechanism to cock, and subsequent de-energizing releases the mechanism, moving the contact arms 89, 91, 92, 93 back to their upper position.

Associated with the contact arm 93 of the transfer switch 90 are an upper contact point 94 and a lower contact point 95. The lower contact point 95 is connected to a contact arm 96 of an upper stepping switch actuator 97. The upper contact point 94 is connected to a contact arm 98 of a lower stepping switch actuator 99. Associated with the contact arm 89 are an upper contact point 100 and a lower contact point 101. The upper contact point 100 is connected to a contact point 102 associated with the contact arm 96, and to the upper terminal of the upper stepping switch actuator 97. The lower contact point 101 is connected to a contact point 103 associated with the contact arm 98, and to the upper terminal of the lower stepping switch actuator 99. The lower terminal of the upper stepping switch actuator 97 is connected to the ground 21 through a contact point 104 and an interrupter contact arm 105. The lower terminal of the lower stepping switch actuator 99 is connected to the ground 21 through a contact point 106 and an interrupter contact arm 107. Contact arms 105 and 107 are normally closed prior to energization of their respective actuators.

Associated with the contact arm 92 are an upper contact point 108 and a lower contact point 109. The upper contact point 108 is connected to a contact arm 110 and to a contact point 111 of a first bank of contacts 112 of an upper stepping switch 113. The lower contact point 109 is connected to a contact arm 114 and to a contact point 115 of a first bank of contacts 116 of a lower stepping switch 117. Associated with the contact arm 91 are an upper contact point 118 and a lower contact point 119. The upper contact point 118 is connected to a contact arm 120 and to a contact point 121 of a second bank of contacts 122 of the upper stepping switch 113. The lower contact point 119 is connected to a contact arm 123 and to a contact point 124 of a second bank of contacts 125 of the lower stepping switch 117.

In addition to the contact point 111, the first bank of contacts 112 of the upper stepping switch 113 includes eleven contact points 130–140. In addition to the contact point 121, the second bank of contacts 122 of the upper stepping switch 113 includes eleven contact points 150–160. In addition to the contact point 115, the first bank of contacts 116 of the lower stepping switch 117 includes eleven contact points 170–180. In addition to the contact point 124, the second bank of contacts 125 of the lower stepping switch 117 includes eleven contact points 190–200.

Each contact point 130–139 of the first bank of contacts 112 of the upper stepping switch 113 is connected respectively to the corresponding contact point 170–179 of the first bank of contacts 116 of the lower stepping switch 117, the contact point 130 being connected to the contact point 170, the contact point 131 being connected to the contact point 171, and so on, the contact point 139 being connected to the contact point 179. The contact points 140 and 180 are left floating.

The upper end of a voltage divider 201 is connected to the ground as is indicated at 21, and the lower end is connected as is indicated at 23 to the B- terminal of the regulated power supply 20. The voltage divider 201 includes ten movable taps 210–219 connected at spaced points thereon. The tap 210 on the voltage divider 201 is connected to the contact points 130, 170, the tap 211 on the voltage divider 201 is connected to the contact points 131, 171, and so on, the tap 219 being connected to the contact points 139, 179 of the first banks of contacts 112, 116 of the upper stepping switch 113 and the lower stepping switch 117, respectively.

Each contact point 151–160 of the second bank of contacts 122 of the upper stepping switch 113 is connected respectively to the corresponding contact point 191–200 of the second bank of contacts 125 of the lower stepping switch 117, the contact point 151 being connected to the contact point 191, the contact point 152 being connected to the contact point 192, and so on, the contact point 160 being connected to the contact point 200. The contact points 150 and 190 are left floating.

The upper stepping switch actuator 97 controls the contact arms 96, 110, and 120 of the upper stepping switch 113, which are ganged as is indicated at 220, and operates the contact arm 105, which acts as an interrupter. When the upper stepping switch actuator 97 is energized, the contact arm 96 is held down in contact with the contact point 102, the interrupter contact arm 105 vibrates to and from the contact point 104, the contact arm 110 of the first bank of contacts 112 moves from its normal home position in contact with the contact point 111 to the contact point 130, then to the contact point 131, and so on, as long as the actuator 97 remains energized, and the contact arm 120 of the second bank of contacts 122 moves from its normal home position against the contact point 121 to the contact point 150, then to the contact point 151, and so on, as long as the actuator 97 remains energized. When the contact arm 110 is at its home position contacting the contact point 111, the contact arm 120 is at its home position contacting the contact point 121; when the contact arm 110 moves to the contact point 130, the contact arm 120 moves to the contact point 150; when the contact arm 110 moves to the contact point 131, the contact arm 120 moves to the contact point 151; and so on through the corresponding steps on the first bank of contacts 112 and the second bank of contacts 122 of the upper stepping switch 113. Energizing of the upper stepping switch actuator 97 causes the stepping mechanism to cock for movement of the contact arms 110, 120 to the next contact points, and the de-energization of the actuator 97 permits the mechanism to move the contact arms 110, 120 to the next contact points. Thus, as the interrupter contact arm 105 opens and closes the circuit to the actuator 97, the contact arm 110 of the first bank of contacts 112 and the contact arm 120 of the second bank of contacts 122 move together from step to step. The contact arm 96 is held down in contact with the contact point 102 for all positions of the contact arms 110, 120 except the home position in which the contact arm 110 is in contact with the contact point 111 and the contact arm 120 is in contact with the contact point 121.

The lower stepping switch actuator 99 controls the contact arms 98, 114, and 123 of the lower stepping switch 117, which are ganged as is indicated at 221, and operates the contact arm 107, which acts as an interrupter. When the lower stepping switch actuator 99 is energized, the contact arm 98 is held down in contact with the contact point 103, the interrupter contact arm 107 vibrates to and from the contact point 106, the contact arm 114 of the first bank of contacts 116 moves from its normal home position in contact with the contact point 115 to the contact point 170, then to the contact point 171, and so on, as long as the actuator 99 remains energized, and the contact arm 123 of the second bank of contacts 125 moves from its normal home position against the contact point 124 to the contact point 190, then to the contact point 191, and so on, as long as the actuator 99 remains energized. When the contact arm 114 is at its home positon contacting the contact point 115, the contact arm 123 is at its home position contacting the contact point 124; when the contact arm 114 moves to the contact point 170, the contact arm 123 moves to the contact point 190; when the contact arm 114 moves to the contact point 171, the contact arm 123 moves to the contact point 191; and so on, through the corresponding steps on the first bank of contacts 116 and the second bank of contacts 125 of the lower stepping switch 117. Energizing of the lower stepping switch actuator 99 causes the stepping mechanism to cock for movement of the contact arms 114, 123 to the next contact points, and de-energization of the actuator 99 permits the mechanism to move the contact arms 114, 123 to the next contact points. Thus, as the interrupter contact arm 107 opens and closes the circuit to the actuator 99, the contact arm 114 of the first bank of contacts 116 and the contact arm 123 of the second bank of contacts 125 move together from step to step. The contact arm 98 is held down in contact with the contact point 103 for all positions of the contact arms 114, 123 except the home position in which the contact arm 114 is in contact with the contact point 115 and the contact arm 123 is in contact with the contact point 124.

The contact points 151, 191 are connected to the upper terminal of a first output relay 231, the lower terminal of which is grounded at 21. The first output relay 231 controls a first output response device 251, which may be a solenoid, counter, signal light, another relay, or any desired voltage-responsive or current-responsive device. The contact points 152, 192 are connected to the upper terminal of a second output relay 232, the lower terminal of which is grounded at 21. The second output relay 232 controls the operation of a second output response device 252. The other contact points of the second bank of contacts 122 of the upper stepping switch 113 and the second bank of contacts 125 of the lower stepping switch 117 are connected in like manner to additional output relays, each pair of connected contact points such as 153, 193 being connected to a separate output relay that controls a separate output response device; the contact points 159, 199 being connected to the upper terminal of an output relay 239, the lower terminal of which is grounded at 21, the output relay 239 controlling an output response device 259; and the contact points 160, 200 being connected to the upper terminal of an output relay 240, the lower terminal of which is grounded at 21, the output relay 240 controlling an output response device 260. The third through the eighth output relays 233 through 238, the third through the eighth output response devices 253 through 258, and their associated circuitry including their connections to the respective contacts 153, 193 through 158, 198 are omitted from the drawing in order to simplify it. The omitted items and circuitry would be redundant since the items and their circuits are identical to those of the output relays and output response devices included in the drawing.

The negative terminal of a rectifier 271 is connected to the upper terminal of the first output relay 231. The positive terminal of the rectifier 271 is connected to a contact arm 281. Associated with the contact arm 281 is a contact point 291, which is connected to the lower end of the resistor 73. Ganged to the contact arm 281 is another contact arm 301, which is connected to the upper terminal of the first output response device 251, the lower terminal of which is grounded at 21. Associated with the contact arm 301 is a contact point 311, which is connected to the positive terminal of a direct voltage source 261, the negative terminal of which is grounded at 21. The voltage source 261 may be of any conventional type and is shown for convenience as a battery. When the first output relay 231 is not energized, the ganged contact arms 281, 301 remain in their upper open position as shown in the drawing. When the first output relay 231 is energized, the ganged contact arms 281, 301 are moved to their lower position with the contact arm 281 contacting the contact point 291 and the contact arm 301 contacting the contact point 311.

The negative terminal of a rectifier 272 is connected to the upper terminal of the second output relay 232. The positive terminal of the rectifier 272 is connected to a contact arm 282. Associated with the contact arm 282 is a contact point 292, which is connected to the lower end of the resistor 73. Ganged to the contact arm 282 is another contact arm 302, which is connected to the upper terminal of the second output response device 252, the lower terminal of which is grounded at 21. Associated with the contact arm 302 is a contact point 312, which is connected to the positive terminal of the voltage source 261. When the second output relay 232 is not energized, the ganged contact arms 282, 302 remain in their upper open position as shown in the drawing. When the second output relay 232 is energized, the ganged contact arms 282, 302 are moved to their lower position with the contact arm 282 contacting the contact point 292 and the contact arm 302 contacting the contact point 312.

The negative terminal of a rectifier 279 is connected to the upper terminal of the ninth output relay 239. The positive terminal of the rectifier 279 is connected to a contact arm 289. Associated with the contact arm 289 is a contact point 299, which is connected to the lower end of the resistor 73. Ganged to the contact arm 289 is another contact arm 309, which is connected to the upper terminal of the ninth output response device 259, the lower terminal of which is grounded at 21. Associated with the contact arm 309 is a contact point 319, which is connected to the positive terminal of the voltage source 261. When the ninth output relay 239 is not energized, the ganged contact arms 289, 309 remain in their upper open position as shown in the drawing. When the ninth output relay 239 is energized, the ganged contact arms 289, 309 are moved to their lower positions with the contact arms 289 contacting the contact point 299 and the contact arm 309 contacting the contact point 319.

The negative terminal of a rectifier 280 is connected to the upper terminal of the tenth output relay 240. The positive terminal of the rectifier 280 is connected to a contact arm 290. Associated with the contact arm 290 is a contact point 300, which is connected to the lower end of the resistor 73. Ganged to the contact arm 290 is another contact arm 310, which is connected to the upper terminal of the tenth output response device 260, the lower terminal of which is grounded at 21. Associated with the contact arm 310 is a contact point 320, which is connected to the positive terminal of the voltage source 261. When the tenth output relay 240 is not energized, the ganged contact arms 290, 310 remain in their upper open position as shown in the drawing. When the tenth output relay 240 is energized, the ganged contact arms 290, 310 are moved to their lower positions with the contact 290 contacting the contact point 300 and the contact arm 310 contacting the contact point 320.

The voltage-classifying circuit shown in the drawing operates as follows:

An input voltage is connected across the input terminals 24, 25, and at the same time the microswitch 28 is closed, either automatically or manually. A current pulse from the direct voltage source 29 through the microswitch 28 and the condenser 31 energizes the pulse relay 27 for approximately 30 milliseconds, as determined by the time constant of the combination of the resistor 30, the capacitor 31, and the relay 27. During this short interval the contact arm 26 is moved to its lower position in contact with the contact point 34, and the contact arm 32 is moved to its lower position in contact with the contact point 35, by the pulse relay 27. The memory capacitor 38 is charged by the input voltage through the contact arm 26 and the contact point 34. The input voltage source should have a low impedance so that the time constant of the source and the memory capacitor 38 is less than one-fourth the time constant of the circuit of the pulse relay 27, and the memory capacitor is certain to be charged to the full input voltage. The voltage source 29 connected through the contact arm 32 and the contact point 35 energizes the transfer switch 90, cocking the transfer switch 90 for movement of the contact arms 91, 92, 89, 93 to their upper position as shown in the drawing, contacting the contact points 118, 108, 100, 94 respectively.

The voltage across the memory capacitor 38 is applied to the grid 36 of vacuum tube 37, and is reflected at the cathode 39 of the vacuum tube 37 which is connected through the resistor 41 to the input or summing point 42 of the D.-C. amplifier 43. The input at the summing point 42 of the D.-C. amplifier 43 is amplified by the D.-C. amplifier 43, and the amplified voltage at the output cathode 60 of the amplifier 43 is connected through the contact arm 53, the contact point 54, and the resistor 63 to the input grid 64 of the D.-C. amplifier 65. The output of the D.-C. amplifier 65 at the output cathode 66 is connected through the resistor 67 to the high speed relay 68. The output of the D.-C. amplifier 65 energizes the high speed relay 68, moving the contact arm 69 to its lower position away from the contact point 70. The mercury-contact relay 77 is in an unenergized state and the contact arm 87 is in its upper position as shown in the drawing in contact with the contact point 88.

After the subsidence of the current pulse through the pulse relay 27, the relay 27 returns to its normal unenergized state and the contact arms 26, 32 return to their upper position as shown in the drawing. The input terminal 25 is thereby disconnected from the circuit, but the input voltage appears across the memory capacitor. The transfer switch 90 moves the contact arms 91, 92, 89, 93 to their upper position as shown in the drawing. The voltage source 29 now energizes the upper stepping switch actuator 97 through the contact arm 32, the contact point 33, the contact arm 87, the contact point 88, the contact arm 89, and the contact point 100. The actuator 97 moves the contact arm 96 to its lower position in contact with the contact point 102, causes the interrupter contact arm 105 to vibrate to and from the contact point 104, and causes the contact arms 110, 120 to move simultaneously in steps from their respective home positions down their respective banks of contacts.

The contact arm 110 of the first bank of contacts 112 moves from its home position in contact with the contact point 111 to the contact point 130, then to the contact point 131, and so on, while the contact arm 120 of the second bank of contacts 122 moves from its home position in contact with the contact point 121 to the contact point 150, then to the contact point 151, and so on, as long as the actuator 97 remains energized. When the contact arm 110 is in contact with the contact point 130, the contact arm 120 is in contact with the contact point 150; when the contact arm 110 is in contact with the contact point 131, the contact arm 120 is in contact with the contact point 151; and so on.

When the contact arm 110 of the first bank of contacts 112 of the upper stepping switch 113 contacts the contact point 130, the voltage at the point 210 of the voltage divider 201 is connected through the contact point 130, the contact arm 110, the contact point 108, the contact arm 92, and the parallel combination of the resistor 95 and the capacitor 96, to the input point 42 of the D.-C. amplifier 43. When the contact arm 110 is in contact with the contact point 131, the voltage at the point 211 on the voltage divider 201 is connected through the contact point 131, the contact arm 110, the contact point 108, the contact arm 92, and the parallel combination of the resistor 95 and the capacitor 96, to the input point 42 of the D.-C. amplifier 43. Similarly, the voltage at the point 212 on the voltage divider 201 is connected to the input point 42 of the D.-C. amplifier 43 when the contact arm 110 is in contact with the contact point 132, and so on.

Let us assume that the input voltage applied across the input terminals 24, 25, and now present across the memory capacitor 38, has a magnitude in the range included in the ninth class of the ten classes into which the voltage range of the classifying circuit is divided. As the contact arm 110 of the first bank of contacts 112 of the upper stepping switch 113 moves from its home position in contact with the contact point 111 to each of the contact points 130–137 the voltage fed back from the voltage divider 201 becomes more negative with each step from the first tap 210 to the eighth tap 217, but the net input at the summing point 42 of the D.-C. amplifier 43 still is greater than zero, and the output of the D.-C. amplifier 65 keeps the high speed relay 68 energized. When the contact arm 110 contacts the contact point 138, however, the voltage at the tap 218 on the voltage divider 201, which is fed through the contact point 138, the contact arm 110, the contact point 108, the contact arm 92, and the parallel combination of the resistor 95 and the capacitor 96 to the summing point 42 of the D.-C. amplifier 43, is at least equal in magnitude, and opposite in polarity, to the net of the amplified input voltage connected by the vacuum tube 37 and the resistor 41 to the summing point 42 and the adjustable center-zero voltage at the movable arm 45 of the potentiometer 46 connected through the resistor 44 to the summing point 42. The output of the D.-C. amplifier 43 is reduced to zero or to a small value of opposite polarity, and the output of the D.-C. amplifier 65 is reduced to zero at this point, so the high-speed relay 68 is no longer energized.

Since the relay 68 is not energized, the contact arm 69 is released and moves to its upper position in contact with the contact point 70. The D.-C. voltage source 29 is connected through the contact arm 32, the contact point 33, the contact arm 69, the contact point 70, and the resistor 74 to the mercury-contact relay 77, energizing the relay 77 after a short time delay as determined by the time constant of the time delay circuit comprising the resistor 74 and the capacitor 76. When the mercury-contact relay 77 is energized, the contact arm 87 is moved to its lower position in contact with the contact point 86, breaking the connection between the voltage source 29 and the upper stepping switch actuator 97. The time delay in the operation of the mercury-contact relay 77 assures sufficient time for the stepping mechanism of the upper stepping switch 113 to cock for movement of the contact arms 110, 120 to the next contact points on their respective banks of contacts 112, 122. When the mercury-contact relay 77 breaks the connection between the voltage source 29 and the upper stepping switch actuator 97, the cocked mechanism moves to the next contact position, with the contact arm 110 of the first bank of contacts 112 in contact with the contact point 139, and with the contact arm 120 of the second bank of contacts 122 in contact with the contact point 159.

When the current pulse in the pulse relay 27 subsided, and the contact arm 32 returned to its upper position in contact with the contact point 33, the voltage source 29 was connected through the contact arm 32, the contact point 33, and the resistor 72 to the lock-in relay 80, energizing the relay 80 and moving the contact arms 78, 81 to their lower position with the contact arm 78 in contact with the contact point 79 and with the contact arm 81 in contact with the contact point 83. There was a short time delay in this action as determined by the time constant of the delay circuit comprising the resistor 72 and the capacitor 84 which was connected thereto through the contact arm 81 and the contact point 82. When the contact arms 78, 81 were moved to their lower position, the capacitor 84 was discharged through the contact arm 81, the contact point 83, and the resistor 85 to the ground 21 to which the lower side of the capacitor 84 is connected. With both the lock-in relay 80 and the mercury-contact relay 77 energized, and with the contact arms 78 and 87 in their lower positions, a lock in connection is completed from the voltage source 29 through the contact arm 32, the contact point 33, the contact arm 87, the contact point 86, the contact point 79, the contact arm 78, and the resistor 75, to the mercury-contact relay 77.

When the next input voltage is connected across the terminals 24, 25, and the microswitch 28 is closed, the pulse relay 27 is momentarily energized by the voltage source 29 through the microswitch 28 and the capacitor 31, moving the contact arms 26, 32 down for approximately 30 milliseconds, depending upon the time constant of the combination of the resistor 30, the capacitor 31, and the relay 27, to their lower position with the contact arm 26 in contact with the contact point 34, and with the contact arm 32 in contact with the lower contact point 35.

The positive terminal of the voltage source 29 is connected through the contact arm 32, the contact point 35, the rectifier 94, the contact arm 91, the contact point 118, the contact arm 120, and the contact point 159, to the upper terminal of the ninth output relay 239, the lower terminal of which is grounded at 21 completing the circuit to the negative terminal of the voltage source 29. The ninth output relay 239 is thereby energized and moves the contact arm 289 to its lower position in contact with the contact point 299, and moves the contact arm 309 to its lower position in contact with the contact point 319. This action takes place while the voltage source 29, which is connected through the contact arm 32 and the contact point 35 to the transfer switch 90, cocks the transfer switch 90, and before the transfer switch 90 moves the contact arms 91, 92, 89, 93 to their lower position.

When the current pulse in the pulse relay 27 subsides and the contact arm 32 returns to its upper position in contact with the contact point 33, the positive terminal of the voltage source 29 is connected through the contact arm 32, the contact point 33, the resistor 73, the contact point 299, the contact arm 289, and the rectifier 279, to the upper terminal of the ninth output relay 239, thereby keeping the output relay 239 energized until the next time the pulse relay 27 is operated. The positive terminal of the voltage source 261 is connected through the contact point 319 and the contact arm 309 of the ninth output relay 239 to the upper terminal of the ninth output response device 259, the lower terminal of which is grounded at 21 completing the circuit to the negative terminal of the voltage source 261. Thus, a predetermined response is provided by the output response device 259.

While the contact arms 26, 32 of the pulse relay 27 are in their lower position, with the contact arm 26 contacting the contact point 34 and with the contact arm 32 contacting the contact point 35, the memory capacitor 38 is charged by the input voltage through the contact arm 26 and the contact point 34, and the voltage source 29 is connected through the contact arm 32 and the contact point 35 to the transfer switch 90, energizing it and cocking it for movement of the contact arms 91, 92, 89, 93 to their lower position. In addition, the connection from the voltage source 29 through the contact arm 32, the contact point 33, and the resistor 72 to the lock-in relay 80 is broken between the contact arm 32 and the contact point 33, and the lock-in relay 80 is de-energized, permitting the contact arms 78, 81 to move to their upper position as shown in the drawing. The connection from the voltage source 29 through the contact arm 32, the contact point 33, the contact arm 69, the contact point 70, and the resistor 74 to the mercury-contact relay 77 is also broken between the contact arm 32 and the contact point 33, and the mercury-contact relay 77 is de-energized, permitting the contact arm 87 to move to its upper position, contacting the contact point 88 as shown in the drawing.

The voltage across the memory capacitor 38 is amplified by the vacuum tube 37, and the amplified voltage at the cathode 39 of the vacuum tube 37 is connected through the resistor 41 to the input or summing point 42 of the D.-C. amplifier 43. The input at the summing point of the D.-C. amplifier 43 is amplified, and the amplified voltage at the output cathode 60 of the amplifier 43 is connected through the contact arm 53, the contact point 54, and the resistor 63, to the input grid 64 of the D.-C. amplifier 65. The output of the D.-C. amplifier 65 at the output cathode 66 is connected through the resistor 67 to the high-speed relay 68. The output of the D.-C. amplifier 65 energizes the high-speed relay 68, moving the contact arm 69 to its lower position away from the contact point 70.

After the subsidence of the current pulse through the pulse relay 27, the relay 27 returns to its normal unenergized state and the contact arms 26, 32 return to their upper position as shown in the drawing. The input terminal 25 is thereby disconnected from the circuit, but the input voltage appears across the memory capacitor 38. The transfer switch 90 moves the contact arms 91, 92, 89, 93 to their lower position contacting the contacts points 119, 109, 101, and 95, respectively. The connection is completed from the voltage source 29 through the contact arm 32, the contact point 33, and the resistor 72 to the lock-in relay 80, moving the contact arms 78, 81 to their lower position contacting the contact points 79, 83, respectively. The mercury-contact relay 77 remains in an unenergized state, however, because the possible connections from the voltage source 29 to the mercury-contact relay 77 are open. The possible connection from the voltage source 29 through the contact arm 32, the contact point 33, the contact arm 69, the contact point 70, and the resistor 74 to the mercury relay 77 is broken between the contact arm 69 and the contact point 70, since the contact arm 69 is in its lower position away from the contact point 70. The possible connection from the voltage source 29 through the contact arm 32, the contact point 33, the contact arm 87, the contact point 86, the contact point 79, the contact arm 78, and the resistor 75 to the mercury-contact relay 77 is broken between the contact arm 87 and the contact point 86, since the contact arm 87 is in its upper position in contact with the contact point 88.

The voltage source 29 is connected through the contact arm 93, the contact point 95, the contact arm 96, and the contact point 102, to the upper stepping switch actuator 97, causing the contact arms 110, 120 of the first and second banks of contacts 112, 122, respectively, to begin stepping again, moving from the contact points 139, 159, respectively, to the contact points 140, 160, respectively, then to the home contact points 111, 121, respectively, at which position the contact arm 96 is released to its upper position as shown in the drawing, breaking the connection from the voltage source 29 to the upper stepping switch actuator 97, and permitting the contact arms 110, 120, to remain at their home position in contact with the contact points 111, 121, respectively. The action is similar regardless of the position of the contact arms 110, 120 from the preceding classifying operation, as the contact arms 110, 120 move simultaneously in steps from any position, the contact arm 96 remaining in its lower position in contact with the contact point 102, until the contact arms 110, 120 reach their home position in contact with the contact points 111, 121, respectively, releasing the contact arm 96 to its upper position away from the contact point 102, breaking the connection to the upper stepping switch actuator 97 and causing the upper stepping switch 113 to stop with its stepping contact arms 110, 120 at their home position in contact with the contact points 111, 121, respectively.

At the same time, the voltage source 29 energizes the lower stepping switch actuator 99 through the contact arm 32, the contact point 33, the contact arm 87, the contact point 88, the contact arm 89, and the contact point 101. The actuator 99 moves the contact arm 98 to its lower position in contact with the contact point 103, causes the interrupter contact arm 107 to vibrate to and from the contact point 106, and causes the contact arms 114, 123 to move simultaneously in steps from their respective home positions down their respective banks of contacts. The contact arm 114 of the first bank of contacts 116 of the lower stepping switch 117 moves from its home position in contact with the contact point 115 to the contact point 170, then to the contact point 171, and so on, while the contact arm 123 of the second bank of contacts 125 moves from its home position in contact with the contact point 124 to the contact point 190, then to the contact point 191, and so on, as long as the actuator 99 remains energized. When the contact arm 114 is in contact with the contact point 170, the contact arm 123 is in contact with the contact point 190; when the contact arm 114 is in contact with the contact point 171, the contact arm 123 is in contact with the contact point 191; and so on.

When the contact arm 114 of the first bank of contacts 116 of the lower stepping switch 117 contacts the contact point 170, the voltage at the point 210 of the voltage divider 201 is connected through the contact point 170, the contact arm 114, the contact point 109, the contact arm 92, and the parallel combination of the resistor 95 and the capacitor 96, to the input point 42 of the D.-C. amplifier 43. When the contact arm 114 is in contact with the contact point 171, the voltage at the point 211 on the voltage divider 201 is connected through the contact point 171, the contact arm 114, the contact point 109, the contact arm 92, and the parallel combination of the resistor 95 and the capacitor 96, to the input point 42 of the D.-C. amplifier 43. Similarly, the voltage at the point 212 on the voltage divider 201 is connected to the input point 42 of the D.-C. amplifier 43 when the contact arm 114 is in contact with the contact point 172, and so on.

Let us assume that the input voltage applied across the input terminals 24, 25, and now present across the memory capacitor 38, has a magnitude in the range included in the second class of the ten classes into which the voltage range of the classifying circuit is divided. As the contact arm 114 of the first bank of contacts 116 of the lower stepping switch 117 moves from its home position in contact with the contact point 115 to each of the contact points 170-179, the voltage fed back from the voltage divider 201 becomes more negative with each step. When the contact arm 114 is in contact with the contact point 170, connecting the voltage at the point 210 of the voltage divider 201 to the input point 42 of the D.-C. amplifier 43, the net input at the summing point 42 of the D.-C. amplifier 43 still is greater than zero, and the output of the D.-C. amplifier 65 keeps the high speed relay 68 energized. When the contact arm 114 contacts the contact point 171, however, the voltage at the tap 211 on the voltage divider 201, which is fed through the contact point 171, the contact arm 114, the contact point 109, the contact arm 92, and the parallel combination of the resistor 95 and the capacitor 96, to the summing point 42 of the D.-C. amplifier 43, is at least equal in magnitude, and opposite in polarity, to the net of the amplified input voltage connected by the vacuum tube 37 and the resistor 41 to the summing point 42 and the adjustable center-zero voltage at the movable arm 45 of the potentiometer 46 connected through the resistor 44 to the summing point 42. The output of the D.-C. amplifier 65 is reduced to zero at this point, and the high speed relay 68 is no longer energized.

Since the relay 68 is not energized, the contact arm 69 is released and moves to its upper position in contact with the contact point 70. The D.-C. voltage source 29 is connected through the contact arm 32, the contact point 33, the contact arm 69, the contact point 70, and the resistor 74, to the mercury-contact relay 77, energizing the relay 77 after a short time delay as determined by the time constant of the time delay circuit comprising the resistor 74 and the capacitor 76. When the mercury-contact relay 77 is energized, the contact arm 87 is moved to its lower position in contact with the contact point 86, breaking the connection between the voltage source 29 and the lower stepping switch actuator 99. The time delay in the operation of the mercury-contact relay 77 assures sufficient time for the stepping mechanism of the lower stepping switch 117 to cock for movement of the contact arms 114, 123 to the next contact points on their respective banks of contacts 116, 125. When the mercury-contact relay 77 breaks the connection between the voltage source 29 and the lower stepping switch actuator 97, the cocked mechanism moves to the next contact position, with the contact arm 114 of the first bank of contacts 116 in contact with the contact point 172, and with the contact arm 123 of the second bank of contacts 125 in contact with the contact point 192.

When the current pulse in the pulse relay 27 subsided, and the contact arm 32 returned to its upper position in contact with the contact point 33, the voltage source 29 was connected through the contact arm 32, the contact point 33, and the resistor 72 to the lock-in relay 80, energizing the relay 80 and moving the contact arms 78, 81 to their lower position with the contact arm 78 in contact with the contact point 79 and with the contact arm 81 in contact with the contact point 83. There was a short time delay in this action as determined by the time constant of the delay circuit comprising the resistor 72 and the capacitor 84 which was connected thereto through the contact arm 81 and the contact point 82. When the contact arms 78, 81 were moved to their lower position, the capacitor 84 was discharged through the contact arm 81, the contact point 83, and the resistor 85 to the ground 21 to which the lower side of the capacitor 84 is connected. With both the lock-in relay 80 and the mercury-contact relay 77 energized, and with the contact arms 78 and 87 in their lower positions, another connection is completed from the voltage source 29 through the contact arm 32, the contact point 33, the contact arm 87, the contact point 86, the contact point 79, the contact arm 78, and the resistor 75, to the mercury-contact relay 77.

When the next input voltage is connected across the terminals 24, 25, and the microswitch 28 is closed, the pulse relay 27 is momentarily energized by the voltage source 29 through the microswitch 28 and the capacitor 31, moving the contact arms 26, 32 down for approximately 30 milliseconds, depending upon the time constant of the combination of the resistor 30, the capacitor 31, and the relay 27, to their lower position with the contact arm 26 in contact with the contact point 34, and with the contact arm 32 in contact with the lower contact point 35.

The connection from the voltage source 29 through the contact arm 32, the contact point 33, the resistor 73, the contact point 299, the contact arm 289, and the rectifier 279, to the ninth output relay 239 is broken between the contact arm 32 and the contact point 33, and the ninth output relay 239 is thereby de-energized. The contact arms 289, 309 move to their upper position as shown in the drawing. The output response device 259 is thereby disconnected from the voltage source 261.

The positive terminal of the voltage source 29 is connected through the contact arm 32, the contact point 35, the rectifier 94, the contact arm 91, the contact point 119, the contact arm 123, and the contact point 192 to the upper terminal of the second output relay 232, the lower terminal of which is grounded at 21 completing the circuit to the negative terminal of the voltage source 29. The second output relay 232 is thereby energized and moves the contact arm 282 to its lower position in contact with the contact point 292, and moves the contact arm 302 to its lower position in contact with the contact point 312. This action takes place while the voltage source 29, which is connected through the contact arm 32 and the contact point 35 to the transfer switch 90, cocks the transfer switch 90, and before the transfer switch 90 moves the contact arms 91, 92, 89, 93 to their upper position.

When the current pulse in the pulse relay 27 subsides and the contact arm 32 returns to its upper position in contact with the contact point 33, the positive terminal of the voltage source 29 is connected through the contact arm 32, the contact point 33, the resistor 73, the contact point 292, the contact arm 282, and the rectifier 272, to the upper terminal of the second output relay 232, thereby keeping the output relay 232 energized until the next time the pulse relay 27 is operated. The positive terminal of the voltage source 261 is connected through the contact point 312 and the contact arm 302 of the second output relay 232 to the upper terminal of the second output response device 252, the lower terminal of which is grounded at 21 completing the circuit to the negative terminal of the voltage source 261. Thus, a predetermined response is provided by the output response device 252.

While the contact arms 26, 32 of the pulse relay 27 are in their lower position contacting the contact points 34, 35 respectively, the voltage source 29 is connected through the contact arm 32 and the contact point 35 to the transfer switch 90, energizing it and cocking it for movement of the contact arms 91, 92, 89, 93 to their upper position. After the subsidence of the current pulse through the pulse relay 27, the relay 27 returns to its normal unenergized state and the contact arms 26, 32 return to their upper position as shown in the drawing. The transfer switch 90 moves the contact arms 91, 92, 89, 93 to their upper position as shown in the drawing, contacting the contact points 118, 108, 100, 94, respectively. The voltage source 29 is connected through the contact arm 93, the contact point 94, the contact arm 98, and the contact point 103, to the lower stepping switch actuator 99, causing the contact arms 114, 123 of the first and second banks of contacts 116, 125, respectively, to begin stepping again, moving from the contact points 172, 192, respectively, to the contact points 173, 193, respectively, then to the contact points 174, 194, respectively, and so on to the home contact points 115, 124, respectively, at which position the contact arm 98 is released to its upper position as shown in the drawing, breaking the connection from the voltage source 29 to the lower stepping switch actuator 99, and permitting the contact arms 114, 123, to remain at their home position in contact with the contact points 115, 124, respectively.

Succeeding input voltages are classified in the same manner as is described above for the first two input voltages. In the operation of the voltage-classifying circuit shown in the drawing each input voltage is classified when the next input voltage is applied. The delay in classification is advantageous in high speed classifying, particularly where the input voltage is a measure of a physical characteristic of an item in a production line, because of the time required to move the item from the point at which the measurement is made to the point at which a response may be provided, as by directing the item to a specific predetermined branch of the production line depending upon its classification.

It is necessary to connect the rectifier 94 as shown, rather than merely a conductor, between the contact arm 91 and the contact point 35, which is connected to the transfer switch 90. If the rectifier 94 were replaced by a conductor, the transfer switch 90 would be energized at improper times. For example, in the classification of the first input voltage as described above, just after the ninth output relay 239 had become energized causing the contact arm 289 to move to its lower position in contact with the contact point 299, and the contact arm 32 of the pulse relay 27 had returned to its upper position in contact with the contact point 33, but before the contact arm 120 of the second bank of contacts 122 of the upper stepping switch 113 had moved away from its position in contact with the contact point 159 to return to its home position, the transfer relay 90 could become energized. The voltage source 29 would be connected through the contact arm 32, the contact point 33, the resistor 73, the contact point 299, the contact arm 289, the rectifier 279, the contact point 159, the contact arm 120, the contact point 118, the contact arm 91, and the conductor that would replace the rectifier 94, to the transfer switch 90. This would keep the transfer switch 90 energized and keep its mechanism in the cocked position preventing the release of the mechanism to move the contact arms 91, 92, 89, 93 to their lower position. The rectifier 94 prevents any such flow of current from the contact arm 91 to the transfer switch 90, and thereby permits the switch 90 to operate in the desired manner.

The rectifiers 271–280 serve two purposes. If these rectifiers were replaced by ordinary conductors, undesired operation of the lock-in relay 80 and of some of the output relays 231–240 might occur. For example, when the ninth output relay 239 was energized and the contact arm 32 was still in its lower position in contact with the contact point 35, the voltage source 29 would be connected through the contact arm 32, the contact point 35, the rectifier 94, the contact arm 91, the contact point 118, the contact arm 120, the contact point 159, the conductor that would replace the rectifier 279, the contact arm 289, the contact point 299, the resistor 73, and the resistor 72, to the lock-in relay 80. This would energize the lock-in relay 80, causing the contact arm 78 to move to its lower position in contact with the contact point 79. If the mercury-contact relay 77 did not operate fast enough to move the contact arm 87 to its upper position before the contact arm 32 returned to its upper position, the mercury-contact relay 77 could become locked in by a connection from the voltage source 29 through the contact arm 32, the contact point 33, the contact arm 87, the contact point 86, the contact point 79, the contact arm 78, and the resistor 75, to the mercury-contact relay 77. This would prevent the proper operation of the classifying circuit. The rectifier 279 prevents any flow of current from the contact point 159 to the contact point 289, and thereby prevents any such improper operation. Without the rectifiers 271–280, a sluggish output relay might become locked in beyond the desired time. For example, if the contact arm 289 of the ninth output relay 239 were slow in moving away from its lower position in contact with the contact point 299 at the time when the second output relay 232 was being energized in response to the second input voltage, the voltage source 29 would be connected through the contact arm 32, the contact point 35, the rectifier 94, the contact arm 91, the contact point 119, the contact arm 123, the contact point 192, the conductor that would replace the rectifier 272, the contact arm 282, the contact point 292, the contact point 299, the contact arm 289, and the rectifier 279 or the conductor that would replace it, to the ninth output relay 239, keeping the relay 239 in an energized condition, and causing it to become locked in again at the same time that the second output relay 232 became locked in, upon the return of the contact arm 32 of the pulse relay 27 to its upper position in contact with the contact point 33. The rectifier 272 prevents any flow of current from the contact point 192 to the contact arm 282, and thereby prevents any such improper operation.

To calibrate the D.-C. amplifier 43 to provide zero output at the output cathode 60 when the input voltage at the input grid 58 is zero, the switch 50 is moved manually to its lower position, with the contact arm 51 in contact with the contact point 52 and with the contact arm 53 in contact with the contact point 55. The input grid 58 is thereby connected through the resistor 56 to the ground 21, and the voltmeter 57 is connected between the output cathode 60 and the ground 21. The movable arm of the potentiometer 59 is set at a position at which an output voltage is obtained, as indicated by the voltmeter 57, then the movable arm of the potentiometer 59 is moved to the point where the output voltage is just reduced to zero.

With the switch 50 in its normal upper position as shown in the drawing, and with known voltages connected across the input terminals 24, 25, the movable arm 45 of the potentiometer 46 and the movable taps 210–219 of the voltage divider 201 are adjusted to provide the desired ranges for all of the voltage classes. The positions of the taps 210–219 determine the widths of the classes. The position of the movable arm 45 of the potentiometer 46 is varied to shift all of the classes up or down; that is, to adjust the "zero" position, or the step at which the stepping switch stops when the input voltage at the terminals 24, 25 is zero.

The circuit can be varied in many obvious ways. The number of classes can be changed in accordance with the number of contacts on the stepping switches. With the same stepping switches the number of classes can be reduced by connecting contacts together or by connecting more than one tap to the same point on the voltage divider 201. The positions of the taps 210–219 of the voltage divider 201 can be varied in any desired manner, to provide classes of equal or unequal widths as desired. The voltage-classifying circuit shown in the drawing includes two stepping switches in order to provide high speed operation. Where slower operation is permissible, one of the stepping switches is omitted, and the microswitch 28 is closed once after the remaining stepping switch has stopped for each input voltage and before the next input voltage is applied. Where still faster operation is desired, more double-banked stepping switches are added in parallel with the two shown in the drawing. A four-pole stepping switch having a step for each of the double-banked stepping switches in the circuit is substituted for the transfer switch 90.

While the form of the invention disclosed herein constitutes a preferred embodiment, it is not intended herein to describe all the possible equivalent forms or ramifications of the invention. It will be understood that the words used are words of description rather than of limitation, and that various changes may be made without departing from the spirit or scope of the invention herein disclosed.

What is claimed is:

1. A voltage-classifying circuit for high speed gauging operations comprising: means for applying an input voltage pulse to said circuit momentarily determined by a gauged characteristic of a product; memory means for retaining said pulse; means for amplifying said input voltage retained by said memory means; a relay energized and actuated by the output of said amplifying means for actuating a stepping switch in said circuit when an input voltage is applied to said circuit; a first bank of contacts in said stepping switch connected to provide at each step thereon a predetermined voltage in opposition to a voltage that is a function of said input voltage and decreasing the output of said amplifier means, said predetermined voltage increasing from step to step; means including said relay for stopping said stepping switch at a step at which the amplifier output is zero and said relay is deenergized depending upon the first step at which said predetermined voltage is at least equal to a voltage that is a predetermined function of said input voltage and the gauged product characteristic, output means, and a second bank of contacts in said stepping switch connected to provide a predetermined electrical connection to said output means depending upon the step at which said stepping switch stops and the gauged product characteristic.

2. A voltage-classifying circuit according to claim 1, in which the contacts of said second bank of contacts on each said stepping switch are connected respectively to each of a plurality of relays providing said output means.

3. A voltage-classifying circuit according to claim 1, in which the contacts of said second bank of contacts on each said stepping switch are connected respectively to actuate each of a plurality of counters providing said output means.

4. A voltage-classifying circuit according to claim 1, in which said memory means includes a capacitor connected to receive said input voltage and to apply to said amplifying means a voltage equal to said input voltage beyond the time when said input voltage is connected to said circuit.

5. A voltage-classifying circuit comprising: means for applying an input voltage to said circuit; means for amplifying said input voltage; relay switching means actuated by the output of said amplifying means; means for connecting said relay switching means to at least one of a plurality of stepping switches in said circuit when an input voltage is applied to said circuit, in such manner that as each input voltage of said succession is applied one said stepping switch is actuated; a first bank of contacts in each stepping switch connected to provide at each step thereon, when actuated by said relay switching means, a predetermined voltage in opposition to a voltage that is a function of said input voltage, said predetermined voltage increasing from step to step; means including said relay switching means for stopping said stepping switch at a step depending upon the first step at which said predetermined voltage is at least equal to a voltage that is a predetermined function of said input voltage; a second bank of contacts in each of said stepping switches connected to provide a predetermined electrical connection depending upon the step at which the stepping switch stops; means for maintaining said predetermined electrical connection beyond the time when said stepping switch remains at said step at which it stops; means for actuating each said stepping switch at a time subsequent to the time at which said predetermined electrical connection is made, and before the time said stepping switch is next actuated by said relay switching means, to move said stepping switch from said step at which it stops to a predetermined position; and output means including a plurality of relays connected respectively to each step contact of said second bank of contacts in each said stepping switch that is connected to provide a predetermined electrical connection.

6. A voltage-classifying circuit comprising: means for applying a succession of input voltages to said circuit; a capacitor connected to receive each said input voltage; means for amplifying the voltage across said capacitor; relay switching means actuated by the output of said amplifying means; means for connecting said relay switching means to at least one of a plurality of stepping switches in said circuit when an input voltage is applied to said circuit, in such manner that as each input voltage of said succession is applied one of said stepping switches is actuated; a first bank of contacts in each said stepping switch connected to provide at each step thereon, when actuated by said relay switching means, a predetermined voltage in opposition to a voltage that is a function of said voltage across said capacitor, said predetermined voltage increasing from step to step; a voltage divider having adjustable contact points thereon to provide each said predetermined voltage, successive contact points on said voltage divider being connected to successive contacts of said first bank of contacts in said stepping switch; means including said relay switching means for stopping said stepping switch at a step depending upon the first step at which said predetermined voltage is at least equal to a voltage that is a predetermined function of said voltage across said capacitor; a second bank of contacts in each said stepping switch connected to provide a predetermined electrical connection depending upon the step at which said stepping switch stops; means for maintaining said predetermined electrical connection beyond the time when said stepping switch remains at said step at which it stops; means for actuating said stepping switch at a time subsequent to the time at which said predetermined electrical connection is made, and before the time said stepping switch is next actuated by said relay switching means, to move said stepping switch from said step at which it stops to a predetermined position; a plurality of relays connected respectively to each step contact of said second bank of contacts in each said stepping switch that is connected to provide a predetermined electrical connection; and means responsive to said last-mentioned relays for providing a predetermined response depending upon which relay is actuated by said predetermined electrical connection provided by said second bank of contacts of said stepping switch.

7. A voltage-classifying circuit comprising: means for applying a succession of input voltages to said circuit; means for amplifying said input voltages; a plurality of stepping switches in said circuit, a relay actuated by the output of said amplifying means for cyclically actuating said stepping switches in a predetermined sequence as input voltages are successively applied to said circuit; a first bank of contacts in each said stepping switch connected to provide at each step thereon, when actuated by said relay, a predetermined voltage in opposition to a voltage that is a function of said input voltage, said predetermined voltage increasing from step to step; means including said relay for stopping said stepping switch at a step depending upon the first step at which said predetermined voltage is at least equal to a voltage that is a predetermined function of said input voltage, output means, a second bank of contacts in each said stepping switch, and means operative upon application of the second of a pair of successive input voltages to the circuit to provide a predetermined electrical connection between said second bank of contacts and said output means depending upon the step at which said stepping switch stops in response to the input voltage of the first of said successive pair of input voltages.

8. A voltage-classifying circuit comprising: means for applying in succession an input voltage to said circuit; means for amplifying said input voltage; relay switching means actuated by the output of said amplifying means; a plurality of stepping switches in said circuit, means operative as each input voltage is applied for connecting said relay switching means to a different one of said stepping switches than was actuated when the preceding input voltage was applied; a first bank of contacts in each said stepping switch connected to provide at each step thereon, when actuated by said relay switching means, a predetermined voltage in opposition to a voltage that is a function of said input voltage, said predetermined voltage increasing from step to step; means including said relay switching means for stopping said stepping switch at a step depending upon the first step at which said predetermined voltage is at least equal to a voltage that is a predetermined function of said input voltage; a second bank of contacts in each said stepping switch connected to provide a predetermined electrical connection depending upon the step at which said stepping switch stops; means for maintaining said predetermined electrical connection beyond the time when said stepping switch remains at said step at which it stops; means for actuating each said stepping switch at a time subsequent to the time at which said predetermined electrical connection is made, and before the time said stepping switch is next actuated by said relay switching means, to move said stepping switch from said step at which it stops to a predetermined position; and a plurality of relays connected respectively to each step contact of said second bank of contacts in each said stepping switch that is connected to provide a predetermined electrical connection.

9. A voltage-classifying circuit comprising: means for applying a succession of input voltages to said circuit; a capacitor connected to receive each said input voltage; means for amplifying the voltage across said capacitor; relay switching means actuated by the output of said amplifying means; means for connecting said relay switching means selectively to one of a plurality of stepping switches in said circuit when an input voltage is applied to said circuit, in such manner that as each input voltage of said succession is applied a different stepping switch is actuated than was actuated when the preceding input voltage was applied; a first bank of contacts in each said stepping switch connected to provide at each step thereon, when actuated by said relay switching means, a predetermined voltage in opposition to a voltage that is a function of said voltage across said capacitor, said predetermined voltage increasing from step to step; a voltage divider having adjustable contact points thereon to provide each said predetermined voltage, successive contact points on said voltage divider being connected to successive contacts of said first bank of contacts in each said stepping switch; means including said relay switching means for stopping said stepping switch at a step depending upon the first step at which said predetermined voltage is at least equal to a voltage that is a predetermined function of said voltage across said capacitor; a second bank of contacts in each said stepping switch connected to provide a predetermined electrical connection depending upon the step at which said stepping switch stops; means connected to said second bank of contacts in each said stepping switch for providing said predetermined electrical connection at a time subsequent to the time when said stepping switch stops; means for maintaining said predetermined electrical connection beyond the time when said stepping switch remains at said step at which it stops; means for actuating each said stepping switch at a time subsequent to the time at which said predetermined electrical connection is made, and before the time said stepping switch is next actuated by said relay switching means, to move said stepping switch from said step at which it stops to a predetermined position; a plurality of relays connected respectively to each step contact of said second bank of contacts in each said stepping switch that is connected to provide a predetermined electrical connection; and means responsive to said last-mentioned relays for providing a predetermined response depending upon which relay is actuated by said predetermined electrical connection provided by said second bank of contacts of each said stepping switch.

10. A voltage-classifying circuit comprising: means for successively applying an input voltage to said circuit; means for amplifying said input voltage; a relay actuated by the output of said amplifying means for actuating, alternatively a pair of stepping switches in said circuit as successive input voltages are applied to said circuit; a first bank of contacts in each said stepping switch connected to provide at each step thereon, when actuated by said relay, a predetermined voltage in opposition to a voltage that is a function of said input voltage, said predetermined voltage increasing from step to step; means including said relay for stopping said stepping switch at a step depending upon the first step at which said predetermined voltage is at least equal to a voltage that is a predetermined function of said input voltage, output means, and a second bank of contacts in each said stepping switches connected to provide a predetermined electrical connection to said output means depending upon the step at which said stepping switch stops.

11. A voltage-classifying circuit comprising: means for applying an input voltage to said circuit; means for amplifying said input voltage; relay switching means actuated by the output of said amplifying means; means for alternatively connecting said relay switching means, a pair of stepping switches in said circuit as successive input voltages are applied to said circuit, whereby as each input voltage of said succession is applied a different stepping switch is actuated than was actuated when the preceding input voltage was applied; a first bank of contacts in each said stepping switch connected to provide at each step thereon, when actuated by said relay switching means, a predetermined voltage in opposition to a voltage that is a function of said input voltage, said predetermined voltage increasing from step to step; means including said relay switching means for stopping said stepping switch at a step depending upon the first step at which said predetermined voltage is at least equal to a voltage that is a predetermined function of said input voltage; a second bank of contacts in each said stepping switch connected to provide a predetermined electrical connection depending upon the step at which said stepping switch stops; means for maintaining said predetermined electrical connection beyond the time when said stepping switch remains at said step at which it stops; means for actuating each said stepping switch at a time subsequent to the time at which said predetermined electrical connection is made, and before the time said stepping switch is next actuated by said relay switching means, to move said stepping switch from said step at which it stops to a predetermined position; and output means including a plurality of relays connected respectively to each step contact of said second bank of contacts in each said stepping switch.

12. A voltage-classifying circuit comprising: means for applying a succession of input voltages to said circuit; a capacitor connected to receive each said input voltage; means for amplifying the voltage across said capacitor; relay switching means actuated by the output of said amplifying means operative when an input voltage is applied to said circuit; means for connecting said relay switching means to a different one of a pair of stepping switches in said circuit than was actuated when the preceding input voltage was applied; a first bank of contacts in each said stepping switch connected to provide at each step thereon, when actuated by said relay switching means, a predetermined voltage in opposition to a voltage that is a function of said voltage across said capacitor, said predetermined voltage increasing from step to step; a voltage divider having adjustable contact points thereon to provide each said predetermined voltage, successive contact points on said voltage divider being connected to successive contacts of said first bank of contacts in each said stepping switch; means including said relay switching means for stopping said stepping switch at a step depending upon the first step at which said predetermined voltage is at least equal to a voltage that is a predetermined function of said voltage across said capacitor; a second bank of contacts in each said stepping switch connected to provide a predetermined electrical connection depending upon the step at which said stepping switch stops; means connected to said second bank of contacts in each said stepping switch for providing said predetermined electrical connection at a time subsequent to the time when said stepping switch stops; means for maintaining said predetermined electrical connection beyond the time when said stepping switch remains at said step at which it stops; means for actuating each said stepping switch at a time subsequent to the time at which said predetermined electrical connection is made, and before the time said stepping switch is next actuated by said relay switching means, to move said stepping switch from said step at which it stops to a predetermined position; a plurality of relays connected respectively to each step contact of said second bank of contacts in each said stepping switch that is connected to provide a predetermined electrical connection; and means responsive to said last-mentioned relays for providing a predetermined response depending upon which relay is actuated by said predetermined electrical connection provided by said second bank of contacts of each said stepping switch.

13. A high speed gauging circuit for classifying a product in accordance with a physical characteristic thereof comprising: means for sequentially applying to said circuit input voltages determined by a succession of gauged product characteristics, memory means for retaining after gauging a signal determined by each input voltage, means providing a variable voltage source, a summing point in said circuit connected for receiving a voltage which is a function of said input voltage signal, stepping means operatively connected to said voltage source and said summing point for sequential application of different reference voltages in opposition to said input voltage function at said summing point, said stepping means including control means continuously connected to said summing point energized in accordance with the resultant of said voltages to operate said stepping means for sequential application of said reference voltages and for stopping said sequential application when a definitive reference voltage is obtained at least equal to the input voltage function and said control means is deenergized, output means for each of a plurality of said reference voltages, and means responsive to said stepping means for controlling a respective one of said output means determined by the definitive reference voltage obtained and the characteristic of each gauged product.

14. A high speed gauging circuit for classifying a product in accordance with a physical characteristic thereof comprising: connection means for providing a signal voltage determined by a gauged product characteristic, input control means for momentarily connecting and disconnecting said connection means to the circuit for a sampling pulse connection of said signal voltage, memory means for retaining and amplifying said signal voltage, stepping means for sequentially providing reference voltages of differing potential, step control means for energizing said stepping means for stepping operation, comparison means connected to said amplifying and stepping means for receiving said signal and reference voltages in opposition, said control means being operatively connected to said comparison means and energized thereby for operation of said stepping means in accordance with the resultant of said signal and reference voltages, said comparison means including means connected to said step control means for deenergization of said control means to discontinue the stepping operation upon a predetermined relation between said signal and reference voltages, whereby a reference voltage is obtained which is definitive of the gauged product characteristic, product classification means for classifying products in accordance with the gauged characteristic, and a classification selector responsive to said stepping means for actuating a predetermined one of said classification means in accordance with the definitive voltage obtained.

References Cited in the file of this patent

UNITED STATES PATENTS

| | | |
|---|---|---|
| 1,669,112 | Winter | May 8, 1928 |
| 2,207,743 | Larson | July 16, 1940 |
| 2,497,961 | Shaw | Feb. 21, 1950 |
| 2,508,424 | Rouy | May 23, 1950 |
| 2,561,722 | Bascom | July 24, 1951 |
| 2,625,822 | Nichols | Jan. 20, 1953 |
| 2,642,527 | Kelley | June 16, 1953 |
| 2,648,057 | Oberman | Aug. 4, 1953 |
| 2,715,718 | Holtje | Aug. 16, 1955 |
| 2,736,006 | Langevin | Feb. 21, 1956 |
| 2,843,839 | Cunningham et al. | July 15, 1958 |

FOREIGN PATENTS

| | | |
|---|---|---|
| 953,544 | France | May 23, 1949 |